(12) United States Patent
Liu

(10) Patent No.: US 9,136,756 B2
(45) Date of Patent: Sep. 15, 2015

(54) SYSTEM AND METHODS FOR TWO-STAGE BUCK BOOST CONVERTERS WITH FAST TRANSIENT RESPONSE

(71) Applicant: Maxim Integrated Products, Inc., San Jose, CA (US)

(72) Inventor: Rui Liu, Fremont, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 180 days.

(21) Appl. No.: 13/858,740

(22) Filed: Apr. 8, 2013

(65) Prior Publication Data

US 2014/0268946 A1    Sep. 18, 2014

Related U.S. Application Data

(60) Provisional application No. 61/785,831, filed on Mar. 14, 2013.

(51) Int. Cl.
*H02M 3/18* (2006.01)
*H02M 3/07* (2006.01)
*H02M 3/158* (2006.01)

(52) U.S. Cl.
CPC .............. *H02M 3/07* (2013.01); *H02M 3/1582* (2013.01)

(58) Field of Classification Search
CPC ..... H02M 3/07; H02M 3/1588; H02M 3/156; H02M 3/0005
USPC ........ 363/60, 59; 323/266, 271, 282; 327/157
See application file for complete search history.

(56) References Cited

U.S. PATENT DOCUMENTS

| | | | |
|---|---|---|---|
| 7,782,027 B2 * | 8/2010 | Williams | 323/266 |
| 2013/0043849 A1 * | 2/2013 | Pagano | 323/271 |

* cited by examiner

*Primary Examiner* — Timothy J Dole
*Assistant Examiner* — Htet Kyaw
(74) *Attorney, Agent, or Firm* — North Weber & Baugh LLP

(57) ABSTRACT

Various embodiments of the invention provide for single and dual phase charge pump, two stage DC/DC buck-boost converters having fast line and load transient control irrespective of load conditions. In certain embodiments of the invention, this is accomplished by controlling a desired output voltage with an error amplifier that controls a plurality of hysteresis comparators. A dual phase charge pump architecture eliminates ripple currents and mode transitions and increases efficiency by splitting the total current between two paths. Certain embodiments allow to use low voltage semiconductor devices, which significantly reduces switching losses and further increases efficiency.

19 Claims, 7 Drawing Sheets

SYSTEM AND METHODS FOR TWO-STAGE BUCK BOOST CONVERTERS WITH FAST TRANSIENT RESPONSE

CROSS REFERENCE TO RELATED PATENT APPLICATIONS

The present application claims priority to U.S. Provisional Application Ser. No. 61/785,831 titled "System and Methods for Two-Stage Buck Boost Converters with Fast Transient Response," filed on Mar. 14, 2013 by Rui Liu, which application is incorporated herein by reference in its entirety.

BACKGROUND

A. Technical Field

The present invention relates to power supplies, and more particularly, to systems, devices, and methods boost-buck converters for fast transient response and seamless transitions.

B. Background of the Invention

Many modern electronic consumer products require power from a regulated and accurate DC voltage sources capable of maintaining tight voltage regulation when subjected to fast transients. Oftentimes, the DC voltage must be stepped up by a boost converter or down to another DC voltage by a buck converter. When the output voltage must be capable of operating at lower and higher voltages, the DC voltage is usually processed by a more complex buck-boost or buck-boost converter. In some existing applications, a conventional buck-boost converter with an H-bridge topology is used to regulate a desired output voltage to a higher or lower value than a given input voltage. The H-bridge topology is used, for example, in power management ICs for smart phone and tablet batteries. However, common to these approaches is that they suffer from large die size, low efficiency, unsatisfactory transient response, and high output voltage ripple. What is needed are tools for system designers to overcome the above-described limitations.

SUMMARY OF THE INVENTION

Various embodiments of the invention provide for a two stage DC/DC buck-boost converter that achieves tight regulation of a desired output voltage as well as fast line and load transient control virtually equivalent to that of a buck converter, regardless of whether the input voltage is higher or lower than the desired output voltage.

In certain embodiments of the invention, the buck-boost converter uses a buck converter in a first stage to convert an input voltage into a first output voltage having a value equal to about one half a desired output voltage. The buck converter is coupled to an unregulated charge pump that doubles the first output voltage of the buck converter stage to reach the desired output voltage. This approach eliminates buck-to-boost or boost-to buck mode transitions characteristic of prior art designs. The right-hand zero limitation on loop bandwidth for conventional buck-boost converters is completely eliminated.

In certain embodiments of the invention, the buck-boost converter employs a simple buck converter control scheme to feed the output voltage of the second stage back to a first stage controller that allows the first stage to compensate the load impedance of the second stage, while the first stage remains decoupled from the desired output voltage. In some embodiments the desired output voltage is controlled by hysteresis comparators that generate a hysteresis window that is controlled by an error amplifier.

One particular embodiment takes advantage of a dual phase charge pump architecture in which each phase switches at 50% duty cycle, each phase operates at 50% duty cycle, and both phases operate 180 degrees out of phase with respect to each other when driving a constant DC load current. As a result, due to the lack of current pulses, an additional advantage of the dual phase charge pump is that there are virtually no ripple currents or di/dt induced ringing voltages present that could generate EMI noise. Instead, only DC load currents flow to the output. Additionally, efficiency is increased as the current flowing through each leg is only half of that of embodiments using a single phase charge pump.

Compared to conventional high voltage MOSFET applications, efficiency is also increased for any given silicon die area by the ability to size semiconductor devices to relatively low voltage ratings. This allows to significantly reduce switching current related losses associated with capacitances internal to MOSFETs. In certain embodiments, the charge pump is configured to operate in bypass mode to further enhance overall efficiency in instances when the input voltage is lower than the desired output voltage.

Certain features and advantages of the present invention have been generally described here; however, additional features, advantages, and embodiments are presented herein will be apparent to one of ordinary skill in the art in view of the drawings, specification, and claims hereof. Accordingly, it should be understood that the scope of the invention is not limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

In the following description, for the purpose of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize that additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily referring to the same embodiment.

Furthermore, connections between components or between method steps in the figures are not restricted to connections that are affected directly. Instead, connections illustrated in the figures between components or method steps may be modified or otherwise changed through the addition thereto of intermediary components or method steps, without departing from the teachings of the present invention. In this document, the term "boost converter" includes any device that is capable of generating a high output voltage form a relatively lower input voltage.

Figure 1:
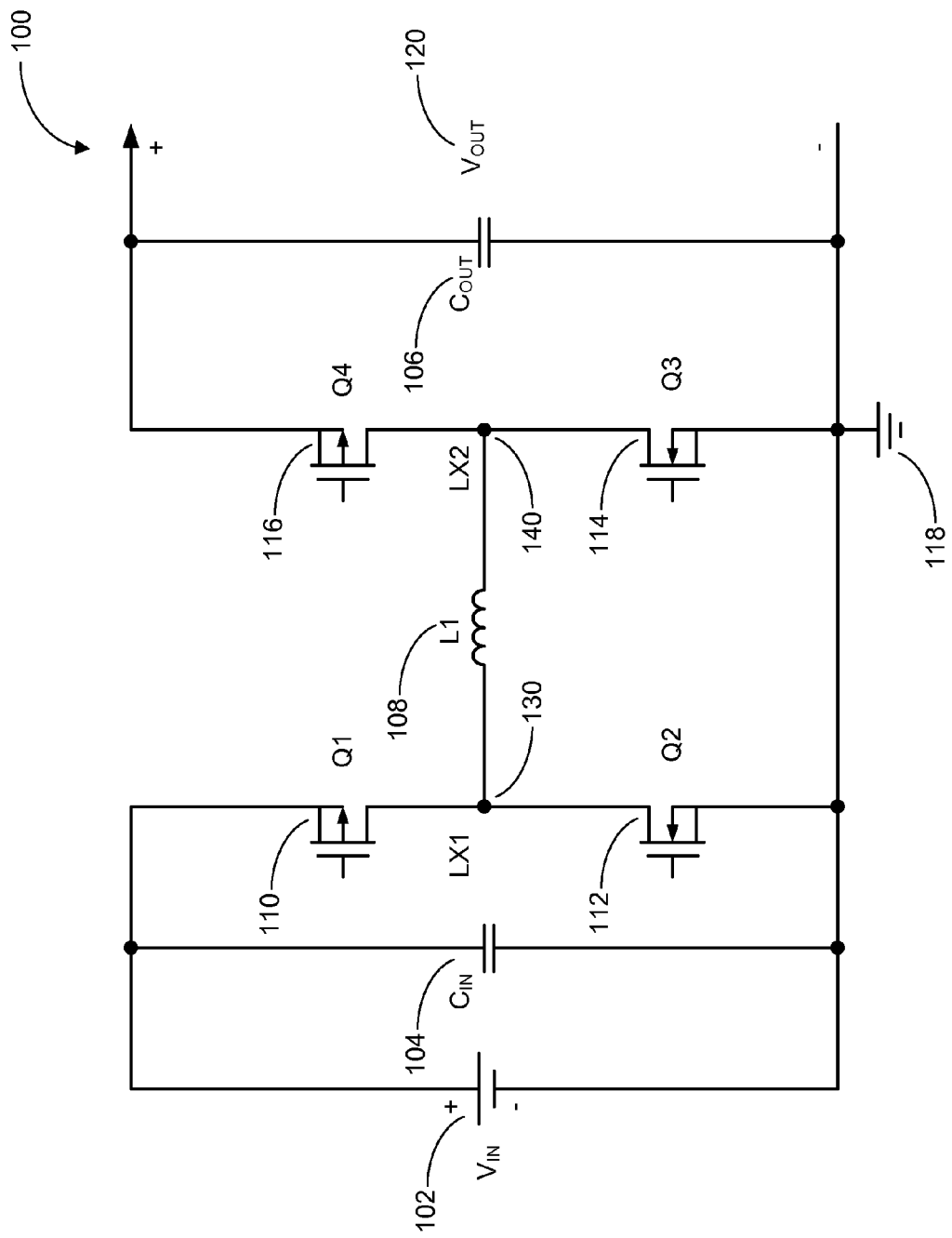
FIG. 1 shows a prior art buck-boost converter circuit.

FIG. 1 shows a prior art buck-boost converter circuit. Buck-boost converter circuit 100 comprises voltage power supply 102, input capacitor $C_{IN}$ 104, output capacitor $C_{OUT}$ 106, inductor L1 108, and MOSFET transistors Q1 110, Q2 112, Q3 114, and Q4 116. Voltage power supply 102, typically a battery, applies a voltage $V_{IN}$ to input capacitor 104. Capacitor 104 is coupled to a series combination of transistors Q1 110 and Q2 112. The drain of transistor Q1 110 and the source of transistor Q2 112 are coupled to one terminal of inductor 108 at node LX1 130. The other terminal of inductor 108 is coupled to the drain of transistor Q4 116 and the source of transistor Q3 114, at node LX2, 140. Output capacitor $C_{OUT}$ 106 is coupled across the series combination of transistors Q3 114 and Q4 116.

Buck-boost converter circuit 100 is designed to switch between two distinct modes of operation, a buck mode and a boost mode, depending on the relationship of the input voltage $V_{IN}$ 102 to output voltage $V_{OUT}$ 120. In detail, circuit 100 operates as a buck converter when the input voltage $V_{IN}$ of the input of power supply 102 exceeds output voltage 120. In this stage, a buck converter is formed by transistors Q1 110 and Q2 112, inductor 108, and output capacitor 106. The buck converter steps down the input voltage $V_{IN}$ provided by power supply 102 to an output voltage 120 that is lower than $V_{IN}$. In this mode, transistor Q4 116 must remain turned on in order to provide an electrical path from node LX2 140 to output capacitor 106.

Conversely, when the input voltage $V_{IN}$ decreases below output voltage $V_{OUT}$ 120, circuit 100 transitions to operate in boost operation mode. In this state, a boost circuit is formed by inductor 108, transistors, Q3 114 and Q4 116, and output capacitor 106. The boost circuit steps up the input voltage to a higher output voltage $V_{OUT}$ 120. Note that in this mode transistor Q1 110 must remain turned on to provide a path from node LX1 130 to input power supply 102.

The overall circuit 100 can alternate between two modes to operate as a single inductor buck boost circuit and process input voltages $V_{IN}$ that can be either higher or lower than $V_{OUT}$ 120.

In most H-bridge designs, however, one leg of the symmetrical topology of circuit 100 typically remains unregulated. For example, the buck stage may be operating under a fixed duty cycle, while only the boost stage is regulated. In situations where input voltage and output voltages are too close to each other, a relatively much more complex control algorithm must be used to transition between the two modes of operation as a function of the relationship between input and output voltages. This is generally accomplished by continuously transitioning between the two modes, as neither mode by itself will be able to regulate output voltage 120.

One major drawback of circuit 100 includes that the H-bridge topology cannot meet very stringent line and load transient response requirements, especially in boost operation mode, which introduces a "right hand zero" control problem typical of boost converters and causes phase margin and stability issues. As a result of relatively poor transient response, the bandwidth of the control loop (not shown) is limited, slowing down the overall circuit response.

Due to the inherent complexity of the accompanying control circuit, the buck-boost topology in circuit 100 also requires a relatively large die size area. Furthermore, circuit 100 suffers from low efficiency and high output voltage ripple, especially in boost mode operation in which the current flowing through Q4 116 is a pulsating current having an average value equal to that of the output current. The peak value of the output current can be many times greater than the average value of the current depending on the ratio of the input to the output voltage 120. To illustrate, at 50% duty cycle, i.e., equal ratio of on and off periods, the peak value of the output current will be twice the value of the average DC current.

Another disadvantage common to all prior art buck, boost, and buck-boost designs is the fact that even if transistor Q2 112 is turned off, it must withstand the same maximum input voltage as transistor Q1 110. Similarly, even when transistors Q4 116 is off, it must withstand the same maximum boost output voltage as Q3 114. In other words, transistors Q2 112, and especially Q3 114, cannot take advantage of being low side transistors and must be designed as high voltage devices.

Figure 2:
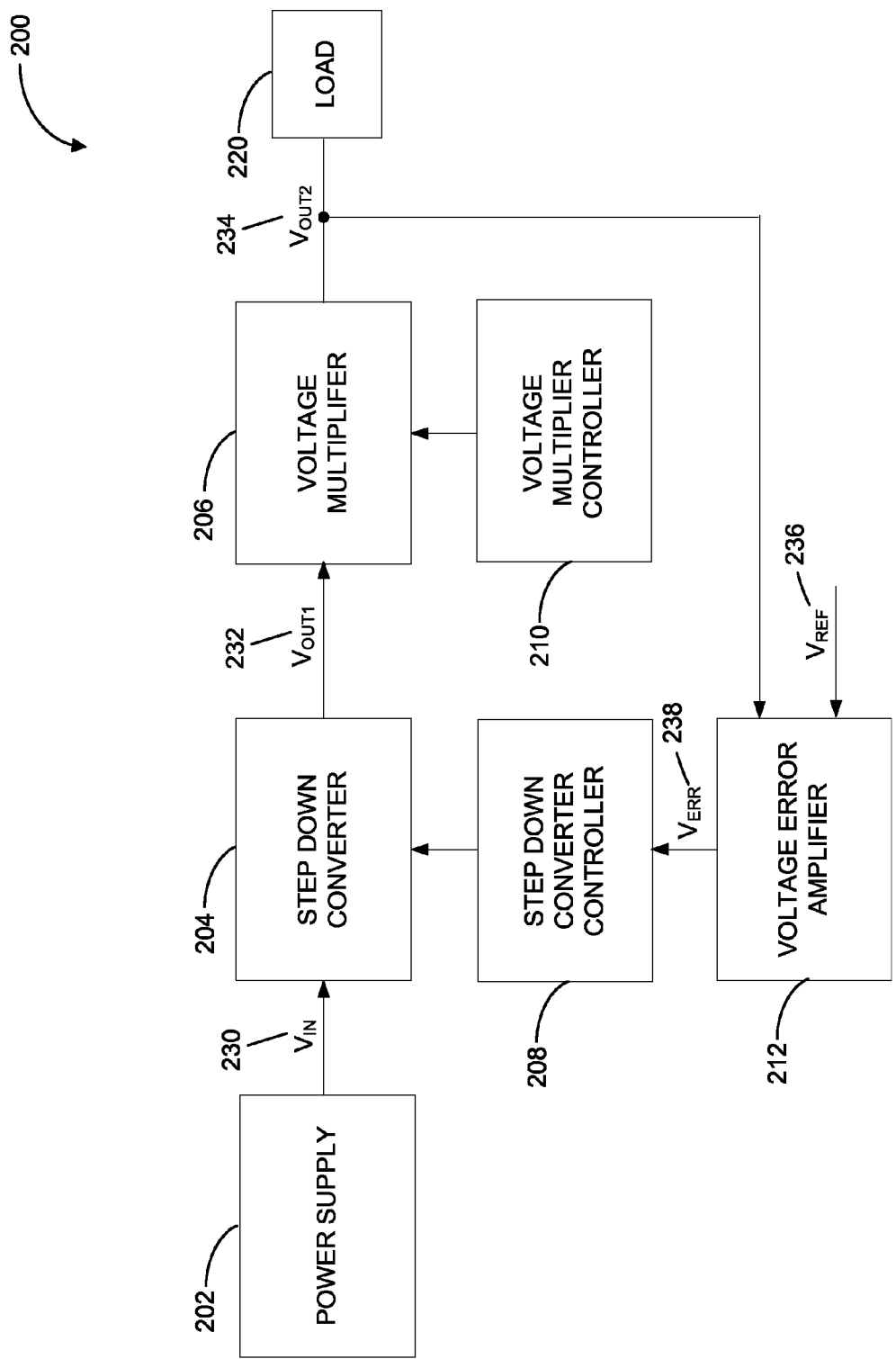
FIG. 2 illustrates a buck-boost converter system according to various embodiments of the invention.

FIG. 2 illustrates a buck-boost converter system according to various embodiments of the invention. Buck-boost converter system 200 comprises power supply 202, step down converter 204, voltage multiplier 206, step down controller 208, voltage multiplier controller 210, voltage error amplifier 212, and load 220. Power supply 202 is coupled to step down converter 204 to provide input voltage $V_{IN}$ 230. Step down converter 204 represents the buck stage of a buck-boost converter. Step down converter 204 is coupled to receive input voltage $V_{IN}$ 230 and convert it into first output voltage $V_{OUT1}$ 232 subject to control by step down controller 208. Output voltage $V_{OUT1}$ 232 of step down converter 204 is input to voltage multiplier 206 to produce desired output voltage $V_{OUT2}$ 234.

In this example, output voltage $V_{OUT2}$ 234 is fed back into voltage error amplifier 212. Voltage error amplifier 212 is coupled to receive output signal $V_{OUT2}$ 234 and reference voltage signal $V_{REF}$ 236 that may be generated by, for example, a reference voltage signal generator (not shown) and provide error voltage signal $V_{ERR}$ 238 to step down controller 208. In one embodiment, voltage error amplifier 212 is further coupled to step down controller 208.

Step down converter 204 is any circuit that can convert input voltage $V_{IN}$ 230 into low value output voltage $V_{OUT1}$ 232. Step down converter 204 comprises inductive and capacitive elements and switching elements. The switching elements may be implemented as semiconductor devices, such as MOSFET devices.

In one embodiment, the output of step down converter 204 comprises one or more elements that may be shared with voltage multiplier 206. For example, one or more output capacitors of step down converter 204 may serve as input capacitors of voltage multiplier 206. Voltage multiplier 206 is a circuit is configured to multiply the input voltage to transform it through charge redistribution into an output voltage that is greater than the input voltage by a desired multiplication factor. Voltage multiplier 206 may be any voltage multiplier known in the art, such as a voltage doubler or voltage tripler, and a fractional charge pump.

In operation, step down converter 204 receives input voltage $V_{IN}$ 230 and converts it into a lower output voltage $V_{OUT1}$ 232. In one embodiment, $V_{OUT1}$ 232 is designed to be about one half of the desired output voltage $V_{OUT2}$ 234. In this example, voltage multiplier 206 is a voltage doubler circuit that doubles output voltage $V_{OUT1}$ 232 received at an input terminal in order to generate voltage $V_{OUT2}$ 234. As a result, step down converter 204 and voltage multiplier 206 of buck-boost converter system 200 combine to form a buck-boost converter that is capable of generating output voltages that are lower and higher than the voltage input to by power supply 202.

In one embodiment, voltage multiplier 206 operates in open loop, i.e., voltage multiplier 206 itself is unregulated, which facilitates a simplified implementation. This is possible as, unlike in the prior art, neither a right hand zero problem nor a transition problem exist as will be explained next. Instead, output voltage $V_{OUT2}$ 234 is regulated via step down controller 208, which is designed to control step down converter 204.

In detail, since voltage multiplier 206 ideally contains only capacitive components and no inductive components, voltage multiplier 206 does not interfere with the closed loop design. As a result, the problem of the right hand zero vanishes, and the bandwidth characteristics of the closed loop design of system 200, which will now be determined solely by step down converter 204, is much higher than in comparable buck-boost systems. In fact, the bandwidth is very close to that of a regular step down converter. This allows for relatively smaller output inductance and capacitance than prior art buck-boost systems and results in virtually the same transient response for buck-boost converter system 200 as for a regular single stage buck converter.

Further, since the output of step down converter 204 is typically adjusted to operate at relatively lower than output voltage $V_{OUT2}$ 234 of voltage multiplier 206, output $V_{OUT1}$ 232 of step down converter 204 is usually lower than $V_{OUT2}$ 234, such that system 200 does not need to switch from one operation mode to another. This eliminates all difficulties that arise in the prior art due to inherent mode transitions when operating back and forth between buck and boost mode.

In one particular embodiment, voltage multiplier 206 is a dual phase voltage doubler circuit that doubles first output voltage $V_{OUT1}$ 232 to generate voltage $V_{OUT2}$ 234. The dual phase voltage doubler circuit comprises a first and a second phase charge pump (not shown) that operate 180 degrees out of phase to prevent pulsating currents and eliminate ripple currents.

Figure 7:
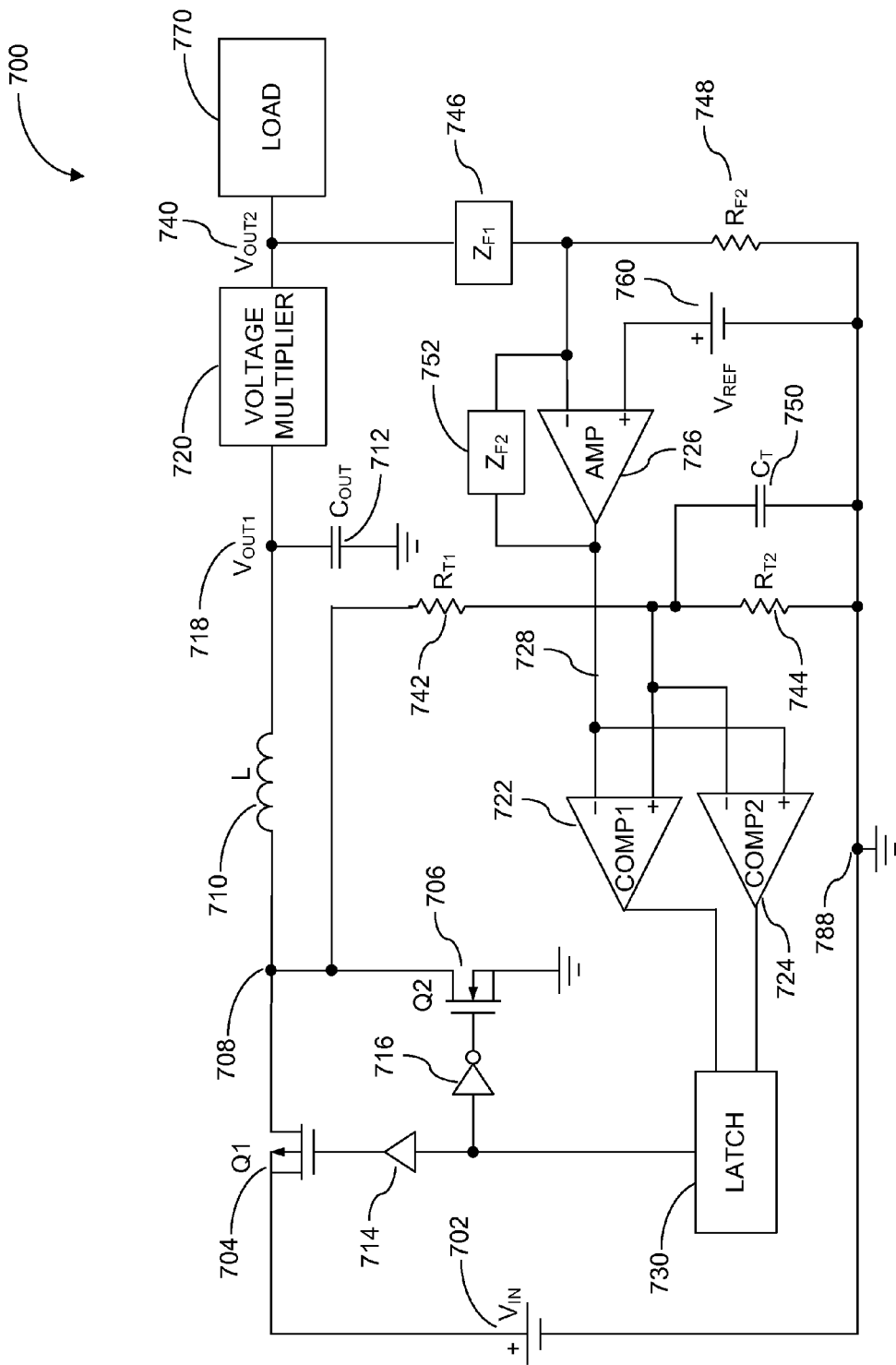
FIG. 7 illustrates an exemplary implementation of the buck-boost converter system in FIG. 2.

It is understood that one or more elements in system 200 may be implemented within a single device or may share circuit components. One possible implementation of system as a hysteresis step down regulator system is shown in FIG. 7.

Figure 3:
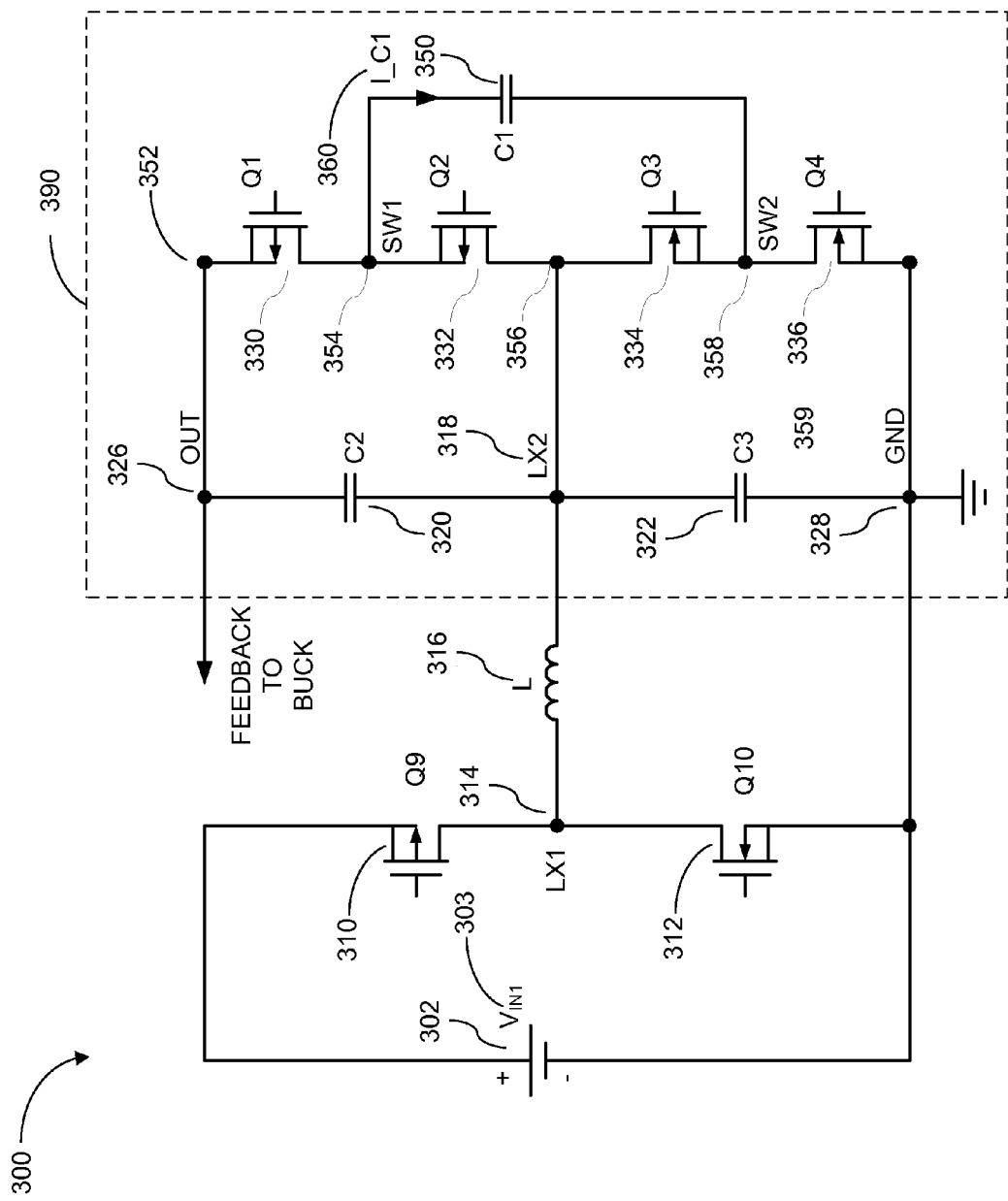
FIG. 3 is a schematic of an illustrative two-stage buck-boost converter comprising a single phase charge pump according to various embodiments of the invention.

FIG. 3 is a schematic of an illustrative two-stage buck-boost converter comprising a single phase charge pump according to various embodiments of the invention. Buck-boost converter circuit 300 comprises voltage power supply $V_{IN}$ 302, inductor L 316, capacitors C2 320, C3 322, and C1 350, and switching elements Q1-Q4 330-336, Q9 310, and Q10 312. Inductor 316 is an inductive storage element, and capacitors 320, 322, 350, are capacitive storage elements. It is noted that capacitors can be implemented as banks of parallel variable capacitors that may be adjusted, for example, by control logic to a predetermined capacitance value. Capacitors C2 320 and C3 322, capacitor C1 350, together with switching elements Q1-Q4 330-336 form charge pump 390 that switches capacitor C1 350 in parallel with capacitor C3 322 during a charging phase, and in parallel with capacitor C2 320 during a charge transfer phase. It is noted that although switching elements Q3 334, Q4 336, and Q9 310 are shown as depletion mode p-channel MOSFET transistors and Q1 330, Q2 332, and Q10 312 are shown as depletion mode n-channel MOSFET transistors in this example, one of ordinary skill in the art will appreciate that any switching element may be implemented by any other switch or switch arrangement. In this example, switching elements Q1-Q4 330-336, Q9 310, and Q10 312 are controlled via gate drivers in response to a difference signal (not shown) representative of the difference between input voltage 303 and output voltage 326.

Voltage power supply 302 may be a battery that provides voltage $V_{IN}$ 303 to a series combination of transistor Q9 310 and Q10 312. At node LX1 314, the drains of transistors Q9 310 and Q10 312 are coupled to one terminal of inductor 316. Both transistors together with inductor L 316 and capacitor C3 322 form a buck converter circuit. Capacitors C2 320 and C3 322, which represent the output of the buck converter, are shared with charge pump circuit 390. Charge pump 390 is a voltage multiplier circuit that, in this example, is a voltage doubler circuit.

As shown in FIG. 3, capacitor C2 320 is coupled between output node 326 and node LX2 318, while capacitor C3 322 is coupled between node LX2 318 and ground potential 328. Transistors Q1 330 and Q2 332 are coupled across capacitor C2 320. Transistors Q3 334 and Q4 336 are coupled across capacitor C3 322. Capacitor C3 322 represents the input capacitor of charge pump 390, while a series combination of capacitors C2 320 and C3 322 form an equivalent output capacitor of charge pump 390 as defined with respect to ground potential 328. Capacitor C1 350 is a flying capacitor that is coupled across the series combination of transistors Q2 332 and Q3 334.

In operation, the buck converter circuit formed by transistors Q9 310, Q10 312, inductor L 316, and capacitor C3 322 operates like a regular buck converter to generate a first output voltage at node LX2 318 representing the output node of the so formed buck converter. The output of the buck converter comprises capacitors C2 320 and C3 322 form a voltage divider at the output of charge pump 390. The voltage divider establishes a voltage across capacitor C3 322 that is typically designed to operate at about one half of a second output voltage at node OUT 326 of charge pump 390, depending on load conditions. As a result, low voltage MOSFETs can be used for the voltage doubler. For example, if the desire output voltage is up to 5 V, then 2.5 V Vds rating MOSFETs can be used. This reduces the die size for given $R_{DS\_ON}$ and switching losses related to capacitances internal to the MOSFETs.

In one embodiment, charge pump 390 doubles the voltage it receives at its input voltage node LX2 318 to generate output voltage $V_{OUT}$ at output node OUT 326. Unlike in the prior art, inductor 316 is not required to perform a boost function and, thus, can be sized smaller than in prior art buck-boost circuits, which facilitates significant size reduction. In this example, the voltage at node LX2 318 is not regulated. However, since charge pump 390 is generally a resistive element that is sensitive to output impedance variations, in order to avoid fluctuations, for example, that the voltage at node OUT 326 decreases as charge pump 390 input current increases, in one embodiment, the output impedance of charge pump 390 is compensated via a buck converter control circuit (not shown) to enable tight output voltage regulation. In other words, the output of the buck converter is indirectly adjusted, by compensating the output impedance of charge pump circuit 390.

In one embodiment, a closed feedback loop is employed to feed back the output voltage $V_{OUT}$ from node OUT 326 to a voltage error amplifier within the buck converter control circuit. $V_{OUT}$ may be coupled to a negative terminal of the voltage error amplifier, whose output is then compared to a fixed reference voltage, so that the control loop can determine whether to increase or decrease $V_{OUT}$ in order to regulate the actual output voltage value $V_{OUT}$. In this way, $V_{OUT}$ can be automatically and continuously compared to a fixed voltage and compensated. For example, when $V_{IN}$ 303 droops, the voltage at node LX2 318 also decreases and causes $V_{OUT}$ of charge pump 390 to decrease. In response, the control circuit increases the output voltage of the buck converter at node LX2 318. Since node LX2 318 is the input to charge pump 390, the increased input voltage will cause charge pump 390 to generate a higher output voltage $V_{OUT}$ at node OUT 326, thereby, restoring $V_{OUT}$ to the desired value. The buck converter control, thus, tightly controls deviations in the output voltage caused by both input voltage transients as well as output current transients.

In one embodiment, the voltage at node LX2 318 may be used to create a ramp voltage that together with a comparator (not shown) and the error voltage amplifier may be used to implement a simple buck converter controller. In one embodiment, a current sense circuit (not shown) may be used determine the load current. This information is then used as a feedback signal to control the buck controller. One of ordinary skill in the art will appreciate that more complex control schemes, such as VCM, may equally be used.

In one embodiment, when output voltage $V_{OUT}$ 326 is relatively much lower than input voltage $V_{IN1}$ 303, circuit 300 operates in bypass mode emulating a prior art buck converter. In bypass mode, circuit 300 charge pump 390 is turned off to save energy, for example, by turning on transistors Q1 330 and Q2 332 and turning off transistors Q3 334 and Q4 336 to disable charge pump 390 and connecting inductor 316 directly to output node 326. The ability to operate in bypass mode further enhance the overall efficiency of circuit 300.

Figure 4:
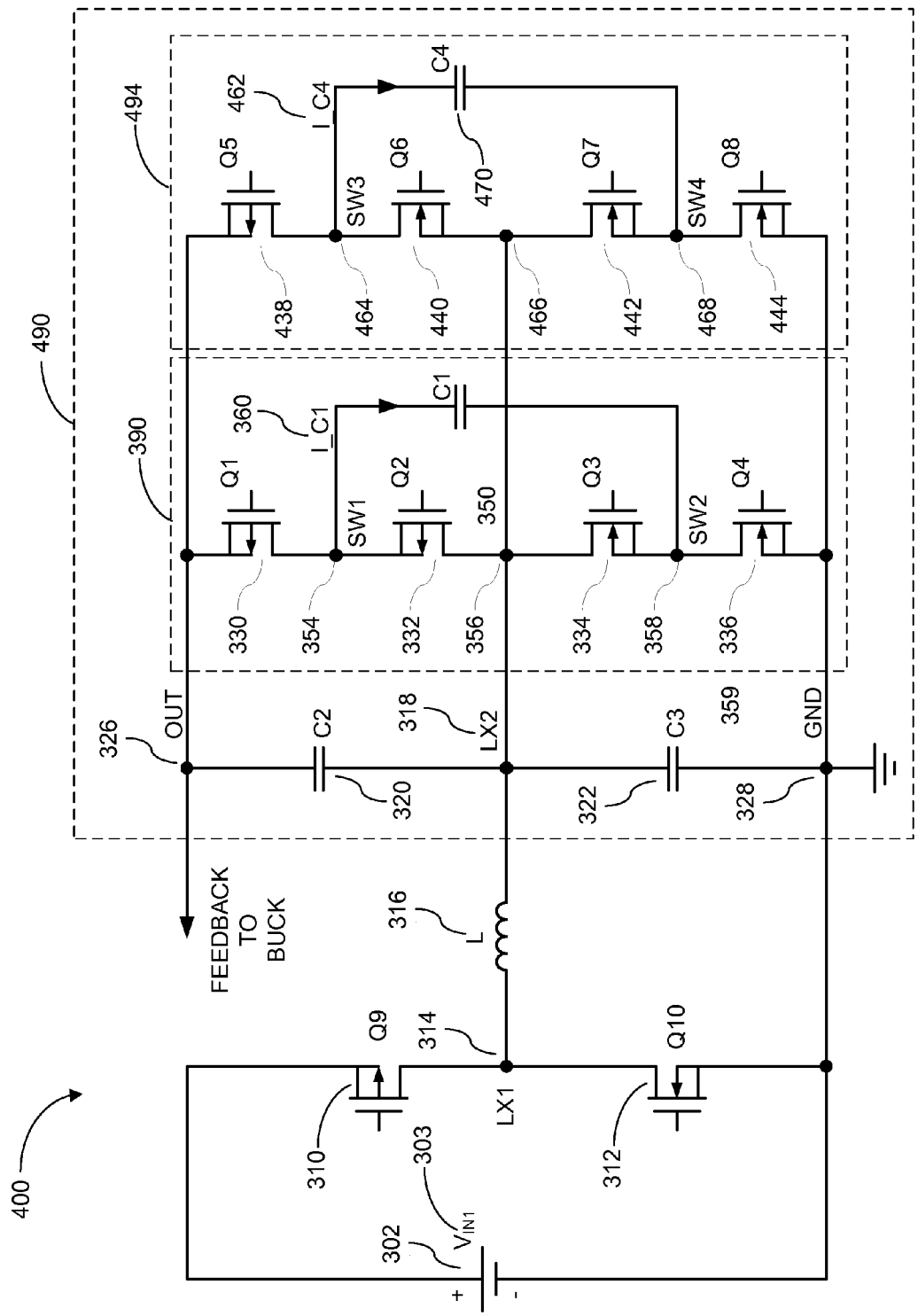
FIG. 4 is a schematic of an illustrative two-stage buck-boost converter circuit comprising a dual phase charge pump according to various embodiments of the invention.

FIG. 4 is a schematic of an illustrative two-stage buck-boost converter circuit comprising a dual phase charge pump according to various embodiments of the invention. Circuit 400 comprises voltage power supply $V_{IN}$ 302, switching elements Q9 310 and Q10 312, inductor L 316, first phase charge pump 390, and second phase charge pump 494. First phase charge pump 390 is similar to charge pump 390 in FIG. 3. Second phase charge pump 494 comprises transistors Q5-Q8 438-444 and flying capacitor C4 470. Components and their function in charge pumps 390 and 494 are similar and are not repeated here for purposes of brevity.

Charge pumps 390 and 494 operate in tandem to double input voltage received at node LX2 318. In one embodiment, first phase charge pump 390 and second phase charge pump 494 operate at 50% duty cycle each, such that the current flowing through each leg is only half of that of the single phase charge pump shown in FIG. 3. This increases efficiency without significantly increasing silicon die size.

In one embodiment, first phase charge pump 390 and second phase charge pump 494 operate 180 degrees out of phase with respect to each other, such that currents flowing through nodes OUT 326, LX2 318, and GND 328 are DC currents. As a result, one major advantage of circuit 400 is that, due to a lack of pulsating currents with high peak values, there are virtually no ripple currents or di/dt-induced ringing voltages present that generate EMI noise. Instead, a DC load current flows to the load.

Figure 5:
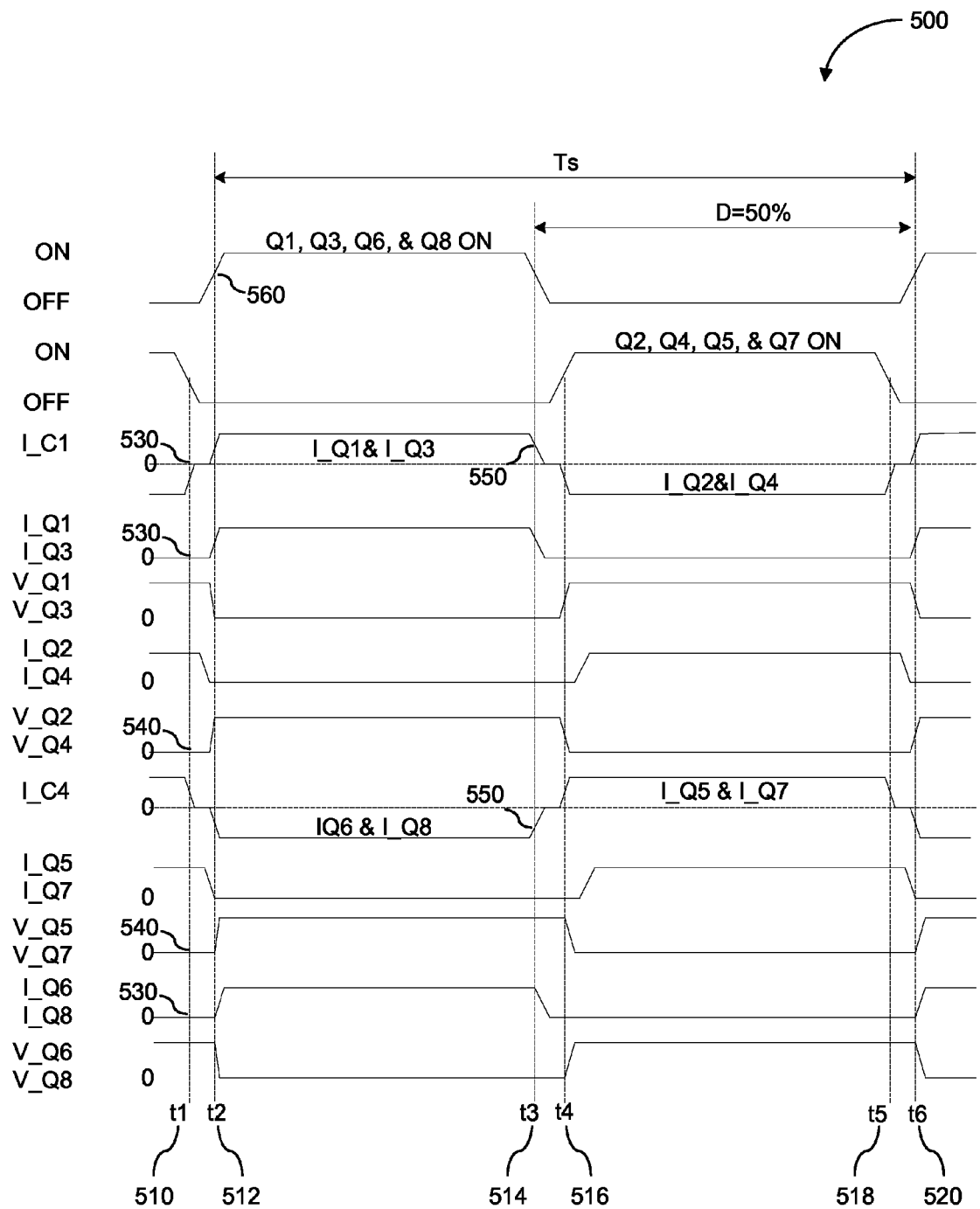
FIG. 5 illustrates exemplary current and voltage waveforms of the voltage doubler in FIG. 4.

FIG. 5 illustrates exemplary current and voltage waveforms of the voltage doubler in FIG. 4. As shown in FIG. 5, at time t1 510, transistors Q2, Q4, Q5 and Q7 are turned off while transistors Q1, Q3, Q6, and Q8 remain off. The currents flowing through Q1, Q3, Q6, and Q8, and currents I_C1 and I_C4 go to zero 530 at t1 510. At this time, the voltage across transistors Q2, Q4, Q5, and Q7 remains zero 540, thus, no switching losses occur. The only significant losses occur are the gate capacitance discharge losses in transistors Q1, Q3, Q6, and Q8.

Cross-conduction losses mainly occur during the MOSFET turning off process. The above description holds at t3 514 when Q1, Q3, Q5, and Q7 are turned off 550.

At time t2 512, transistors Q1, Q3, Q6, and Q8 turn on 560. Their drain-to-source voltage discharges while the drain-to-source voltages of Q2, Q4, Q5 and Q7 build up. This process finishes when the drain-to-source voltages of transistors Q2, Q4, Q5 and Q7 reach half of the output voltage. At this moment transistors Q1, Q3, Q5, and Q7 are fully turned on.

Capacitor C1 discharges to output while capacitor C4 is charged by the input during the time period [t2, t3] 512-514. This description holds during the period [t4, t5] except that capacitor C4 discharges to the output while capacitor C1 is charged the input. Conduction losses occur during periods [t2, t3] 512-514 and [t4, t5] 516-518.

Since capacitors C1 and C4 alternately deliver energy to the output during periods [t2, t3] 512-514 and [t4, t5] 516-518 and stop delivering during switching transitions [t1, t2] 510-512 and [t3, t4] 514-516, the output ripple current is virtually zero, resulting in very small output ripple voltage under all input voltage conditions.

Figure 6:
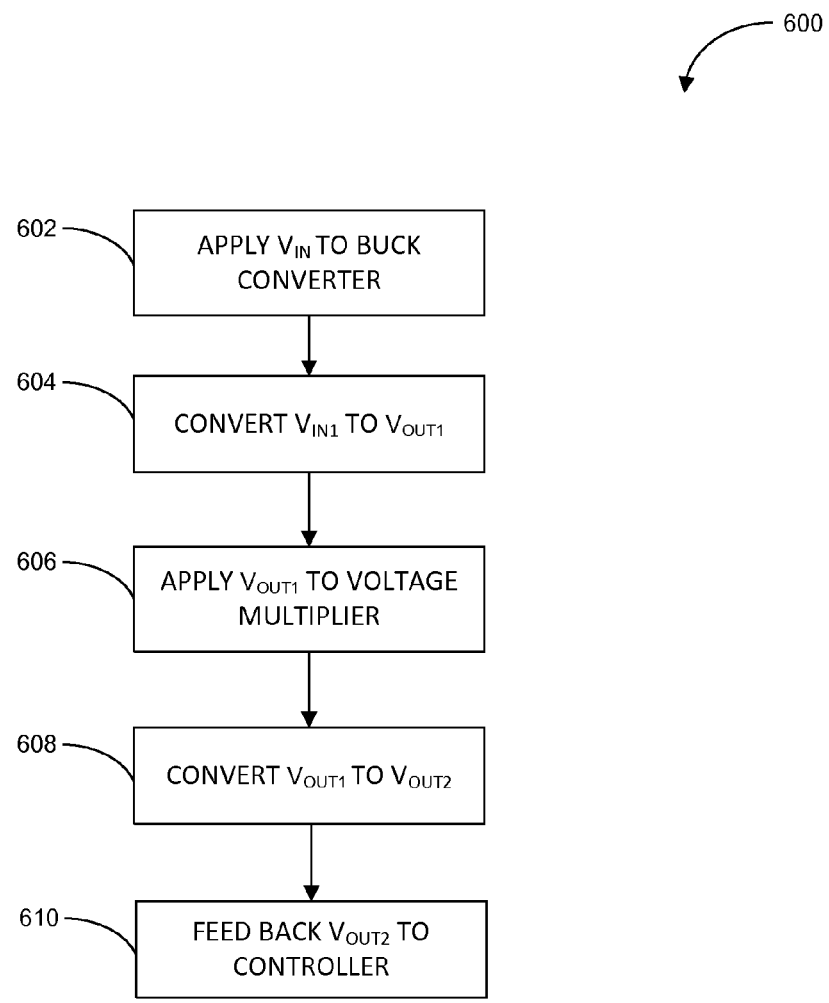
FIG. 6 is a flowchart of an illustrative process for converting an input voltage to an output voltage using a buck-boost converter in accordance with various embodiments of the invention.

FIG. 6 is a flowchart of an illustrative process for converting an input voltage to an output voltage using a buck-boost converter in accordance with various embodiments of the invention.

The conversion process starts at step 602 when the buck-boost converter receives an input signal. The input signal is applied to a first stage of the buck-boost converter. The first stage may be a buck converter.

At step 604, first stage converts the input signal to a first output signal.

At step 606, the first output signal is applied to a voltage multiplier circuit, which may be a fractional voltage multiplier.

At step 608, the voltage multiplier circuit converts the first output signal into a second output signal.

At step 610, the second output signal is fed back to a controller of the first stage.

It will be appreciated by those skilled in the art that fewer or additional steps may be incorporated with the steps illustrated herein without departing from the scope of the invention. No particular order is implied by the arrangement of blocks within the flowchart or the description herein.

FIG. 7 illustrates an exemplary implementation of the buck-boost converter system in FIG. 2 as a hysteresis step down regulator suitable for two stage buck-boost applications. Hysteresis step down regulator system 700 comprises power supply 702, transistors 704 and 706 comprising gate buffers 714 and 716, respectively, inductor 710, capacitor 712, 750, reference voltage 760, voltage multiplier 720, voltage error amplifier 726, load 770, resistor 742-748, comparator 722, 724, and latch 730. Transistors 704, 706, gate buffers 714, 716, inductor 710, and output capacitor 712 form a step down converter that is coupled to power supply 702 to receive input voltage $V_{IN}$ and convert it to intermediate output voltage $V_{OUT1}$ 718. This voltage is input to voltage multiplier 720, which generates desired output voltage $V_{OUT2}$ 740.

Output voltage $V_{OUT2}$ 740 is fed into a negative terminal of voltage error amplifier 726 via compensation network $Z_{F1}$ 746. The positive terminal is coupled to ground 788 via reference voltage 760. Compensation feedback network $Z_{F2}$ 752 is coupled between the input and output of voltage error amplifier 726. Voltage error amplifier 726 generates error voltage signal 728 that is forwarded to the negative input terminal of first hysteresis comparator 722. The positive input terminal of first hysteresis comparator 722 is coupled to ground 788 via a parallel combination of resistor $R_{T1}$ 744 and forward capacitor $C_T$ 750. Note that unlike in a typical single stage buck capacitor $C_T$ 750 is not directly connected to an output voltage. The inputs of second hysteresis comparator 724 are coupled to the inputs of opposite polarity of first hysteresis comparator 722. The outputs of first and second hysteresis comparator 722, 724 are input to latch 730 that is coupled to gate buffer 714, 716.

In operation, voltage error amplifier 726 compares output of voltage multiplier 720 to reference voltage 760 to generate error voltage signal 728. Error voltage signal 728 is fed back to transistor 704, 706 via gate buffer 714, 716 in order to control output voltage 718. Compensation circuit comprising network 746, 752 ensures stable operation of voltage error amplifier 726 preventing, for example, undesired oscillations. Compensation feedback network 746, 752 may comprise resistors and capacitors (not shown). In one embodiment, comparator 722, 724 enables hysteresis control of voltage multiplier 720 by allowing error voltage signal 728 to be compared against two threshold values of unequal value, so that error voltage signal 728 can be maintained within a hysteresis window when controlling transistors Q1 704 and Q2 706 of the buck of buck-boost converter system 700.

In one embodiment, comparator 1 722 is used to adjust the upper threshold value, while comparator 2 724 adjusts the lower threshold value. As a result, the width of the window, i.e., the upper and lower limits are fixed by the internal design of comparator 1 722 and comparator 2 724. The location of the hysteresis window is automatically adjusted via error voltage signal 728 by moving the window higher or lower based on output voltage 740.

Signal 708, in general, has a pulsating voltage waveform with a peak value equal to the input voltage 702. When signal 708 is received by a parallel combination of resistor $R_{T1}$ 744 and capacitor $C_T$ 750, this combination generates a voltage ramp that allows comparator 722, 724 to compare error voltage signal 728 against the two threshold voltages. Based on the location of the window, the voltage ramp determines the switching frequency and duty cycle of hysteresis step down regulator system 700.

Latch 730 determines which transistor 704, 706 will be turned on via gate buffer 714, 716 at any given time, based on the output signals of comparator 1 722 and comparator 2 724. For example, when, in response to a signal by comparator 1 722, the output of latch 730 goes to a logic high, transistor Q1 704 turns on and Q2 706 turns off because, as shown, buffer 716 is an inverting buffer. Conversely, when latch 730 signal returns to a low value Q1 704 turns off and Q2 706 turns on. In this way, latch 730 ensures that noisy signals (e.g., jitter) received form the outputs of comparator 1 722 and comparator 2 724 will not result in faulty decisions.

It will be appreciated that the preceding examples and embodiments are exemplary and are for the purposes of clarity and understanding and not limiting to the scope of the present invention. It is intended that all permutations, enhancements, equivalents, combinations, and improvements thereto that are apparent to those skilled in the art, upon a reading of the specification and a study of the drawings, are included within the scope of the present invention. It is therefore intended that the claims include all such modifications, permutations, and equivalents as fall within the true spirit and scope of the present invention.

I claim:

1. A switching regulator to convert an input voltage into an output voltage, the switching regulator comprising:
   a first switching stage coupled to a first output voltage node, the first switching stage receives a first input voltage to convert it into a first output voltage that is relatively lower than the first input voltage;
   a second switching stage coupled to the first output voltage node, the second switching stage receives the first output voltage and converts the first output voltage to a second output voltage at a second output voltage node, the second output voltage is relatively higher than the first output voltage;
   first and second charge storage devices coupled to the first output voltage node;
   and
   a first flying capacitor that is coupled in parallel with the first charge storage device during a charging phase and in parallel with the second charge storage device during a charge transfer phase.

2. The switching regulator according to claim 1, wherein the second switching stage comprises a first and second phase voltage multipliers configured to operate out of phase with respect to each other.

3. The switching regulator according to claim 1, wherein the first and second charge storage devices form a voltage divider, the first charge storage device serves as an output capacitor of the first switching stage.

4. The switching regulator according to claim 1, wherein the second switching stage is one of a voltage doubler, a voltage tripler, and a fractional voltage multiplier.

5. The switching regulator according to claim 1, further comprising a second flying capacitor coupled within the second switching stage, the first flying capacitor and second flying capacitor are alternately charged and discharged to generate the second output voltage.

6. The switching regulator according to claim 1, wherein the second switching stage comprises a first phase voltage multiplier and a second phase voltage multiplier configured to operate 180 degrees out of phase with respect to each other.

7. The switching regulator according to claim 6, further comprising a plurality of switching elements coupled to the first flying capacitor coupled in parallel with the first charge storage device.

8. The switching regulator according to claim 7, wherein one or more switching elements are MOSFET transistors that are controlled by gate drivers in response to a difference signal.

9. The switching regulator according to claim 1, further comprising a voltage multiplier controller to control the second switching stage.

10. A method of operating a switching regulator, the method comprising:
    applying an input voltage to a first stage of the switching regulator;
    converting the input voltage to a first output voltage;
    operating at least two voltage multipliers out of phase with respect to each other;

applying the first output voltage to a voltage multiplier circuit; and converting the first output voltage into a second output voltage by alternately coupling a first flying capacitor in parallel with first and second capacitors of the switching regulator.

11. The method according to claim 10, wherein the second output voltage is higher than the first output voltage.

12. The method according to claim 10, further comprising operating the first output voltage at about one half of the second output voltage.

13. The method according to claim 10, further comprising applying the second output voltage to a controller configured to control the first stage.

14. The method according to claim 10, further comprising applying a voltage error signal to a step down converter controller.

15. The method according to claim 14, further comprising compensating an output impedance of the voltage multiplier via the step down converter controller.

16. The method according to claim 10, further comprising coupling a first stage output capacitor in parallel with a flying capacitor during a charging phase.

17. A switching regulator system comprising:
a first switching stage coupled to receive a first input voltage and convert it into a first output voltage that is relatively lower than the first input voltage;
a second switching stage coupled to receive the first output voltage and convert it to a second output voltage that is relatively higher than the second input voltage;
first and second hysteresis comparators defining respective upper and lower threshold values of a hysteresis window; and
an error amplifier coupled in a feedback configuration between a second output voltage node and the first switching stage, the error amplifier generates an error signal to adjust a location of the hysteresis window, such that the converter controller controls the second output voltage based on the error signal;
first and second charge storage devices coupled to a first output voltage node;
and
a first flying capacitor that is coupled in parallel with the first charge storage device during a charging phase and in parallel with the second charge storage device during a charge transfer phase.

18. The system according to claim 17, further comprising a forward capacitor connected to the first hysteresis comparator and a ground potential.

19. The system according to claim 17, further comprising a current sense circuit to generate an output signal representative of a load current, the output signal is fed back to the error amplifier to control or generate the error signal.

* * * * *